(12) United States Patent
Hagenbuch

(10) Patent No.: US 9,776,549 B2
(45) Date of Patent: Oct. 3, 2017

(54) OFF-HIGHWAY EQUIPMENT HEAVY DUTY VEHICLE RECOVERY TOOL

(76) Inventor: LeRoy G. Hagenbuch, Peoria Heights, IL (US)

( * ) Notice: Subject to any disclaimer, the term of this patent is extended or adjusted under 35 U.S.C. 154(b) by 0 days.

(21) Appl. No.: 13/544,913

(22) Filed: Jul. 9, 2012

(65) Prior Publication Data

US 2013/0009384 A1 Jan. 10, 2013

Related U.S. Application Data

(60) Provisional application No. 61/505,889, filed on Jul. 8, 2011.

(51) Int. Cl.
*B60P 3/12* (2006.01)

(52) U.S. Cl.
CPC .............. *B60P 3/122* (2013.01); *B60P 3/125* (2013.01)

(58) Field of Classification Search
CPC ................................. B60P 3/122; B60P 3/125
USPC ................... 280/425.1, 425.2; 414/560, 563
See application file for complete search history.

(56) References Cited

U.S. PATENT DOCUMENTS

| | | | |
|---|---|---|---|
| 3,417,890 A * | 12/1968 | Yamazaki | 414/478 |
| 3,635,492 A * | 1/1972 | Mauldin | 280/43.23 |
| 3,800,966 A | 4/1974 | Newton | |
| 5,326,215 A * | 7/1994 | Eberhardt | 414/563 |
| 5,435,586 A * | 7/1995 | Smith | 280/425.2 |
| 5,775,868 A | 7/1998 | Mann | |
| 6,371,505 B1 | 4/2002 | Turner, II | |
| 6,874,803 B2 * | 4/2005 | McDougall et al. | 280/441.2 |
| 7,547,179 B1 | 6/2009 | Edmonson | |
| 7,950,685 B2 | 5/2011 | Hagenbuch | |
| 8,317,215 B2 * | 11/2012 | Quenzi et al. | 280/425.1 |
| 2001/0001637 A1 | 5/2001 | Zanzig et al. | |
| 2004/0213658 A1* | 10/2004 | Hedley et al. | 414/563 |
| 2005/0158162 A1 | 7/2005 | Shubert | |
| 2009/0322057 A1* | 12/2009 | Quenzi et al. | 280/423.1 |

OTHER PUBLICATIONS

Farm Industry News, Smart Buyer, retrieved from http://www.retrieverth.com/th_features.html on Jul. 10, 2012 (3 pages).
The International Search Report from co-pending International application No. PCT/US2012/045990 dated Sep. 28, 2012.
U.S. Appl. No. 14/032,901, filed Sep. 20, 2013.
Examination report for co-pending Chilean Patent Application No. 0028-2014, dated Feb. 23, 2017.
Search Report and Written Opinion from related International Patent Application No. PCT/US2013/060944, dated Feb. 18, 2014.
Preliminary Report on Patentability for related International Patent Application No. PCT/US2013/060944, dated Apr. 2, 2015.

* cited by examiner

*Primary Examiner* — Joseph Rocca
*Assistant Examiner* — Felicia L Brittman
(74) *Attorney, Agent, or Firm* — Leydig, Voit & Mayer, Ltd.

(57) ABSTRACT

An apparatus for recovering large disabled off-highway vehicles. The apparatus utilizes a trailing axle structure configured to hook up and tow off-highway disabled vehicles. The apparatus includes a trailing axle in conjunction with a trailing structure that is raised and lowered with hydraulic cylinders in relation to the trailing axle so that the trailing structure can hook and unhook from disabled off-highway vehicles as well as hook and unhook from off-highway lowboy trailers either mid section on the trailing structure or at the rear of the trailing structure.

19 Claims, 15 Drawing Sheets

OFF-HIGHWAY EQUIPMENT HEAVY DUTY VEHICLE RECOVERY TOOL

CROSS REFERENCE TO RELATED APPLICATIONS

This application claims benefit of U.S. provisional patent application Ser. No. 61/505,889, filed on Jul. 8, 2011, which is hereby incorporated by reference in its entirety.

TECHNICAL FIELD OF THE INVENTION

This invention generally relates to a Heavy Duty-High Capacity Vehicle Recovery Arrangement and more particularly to a Vehicle Recovery Tool capable of recovering disabled equipment such as that used in quarries, mines, steel mills, power plants and landfills. This invention further relates to a Heavy Duty-High Capacity Vehicle Recovery Tool that can be used both for picking up one end of a disabled piece of equipment and towing that piece of disabled equipment and/or hooking onto a Lowboy Trailer in one of several different configurations for hauling/carrying all types of equipment including disabled pieces of equipment. This invention further relates to a Heavy Duty-High Capacity Vehicle Recovery Tool capable of picking up and towing the largest pieces of off-highway equipment (trucks, loaders, etc.) using a smaller Vehicle Recovery Tool Towing Prime Mover. For example, a 100 ton class off-highway truck can tow a 200 ton class off-highway truck, a 150 ton class off-highway truck can tow a 300 ton class off-highway truck, and a 200 ton class off-highway truck can tow a 400 ton class off-highway truck while still maintaining the stability of the Heavy Duty-High Capacity Vehicle Recovery Tool Towing Prime Mover.

BACKGROUND OF THE INVENTION

Today, off-highway trucks, in particular off-highway trucks having carrying capacities of four-hundred (400) tons or more, are used in a number of off-road environments for hauling a variety of materials. As the generic name implies, these vehicles are limited to off-highway and/or private road use and are commonly used in a mining environment. Typically, these off-highway vehicles operate on unpaved gravel/aggregate roads.

In mining operations, fleets of off-highway trucks approach fifty (50) to one hundred (100) off-highway trucks, with these off-highway trucks often operating twenty-four (24) hours a day, three hundred sixty (360) plus days a year. Operating around the clock, environmental conditions can be challenging and it is not unusual for an off-highway truck or vehicle to occasionally become disabled.

Because of the sheer size and weight of such off-highway trucks or vehicles (often approaching hundreds of thousands of pounds and often standing over twenty (20) feet high) the task of recovering and/or retrieving such a disabled off-highway truck or vehicle and moving it to a repair facility can be unique and challenging. Typical sizes of off-highway trucks used in mining environments, etc denoted by their payload classes, gross loaded vehicle weights, and empty weights are;

1. 50 Ton Class Payload
    Gross Laden Weight 200,000 lbs/Empty Weight 80,000 lbs.
2. 100 Ton Class Payload
    Gross Laden Weight 400,000 lbs/Empty Weight 160,000 lbs.
3. 150 Ton Class Payload
    Gross Laden Weight 550,000 lbs/Empty Weight 240,000 lbs.
4. 200 Ton Class Payload
    Gross Laden Weight 715,000 lbs/Empty Weight 320,000 lbs.
5. 250 Ton Class Payload
    Gross Laden Weight 850,000 lbs/Empty Weight 360,000 lbs.
6. 300 Ton Class Payload
    Gross Laden Weight 1,000,000 lbs/Empty Weight 440,000 lbs.
7. 350 Ton Class Payload
    Gross Laden Weight 1,260,000 lbs Empty Weight 560,000 lbs.
8. 400 Ton Class Payload
    Gross Laden Weight 1,380,000 lbs/Empty Weight 610,000 lbs.

In each of these classes different brands of off-highway trucks will have plus/minus payload tonnage, gross laden weight, and empty weight variations.

Off-highway trucks in particular are one of the most prevalent mobile vehicles on a typical mine site. By way of reference, 90 to 95% availability of a mine off-highway truck fleet is considered excellent availability, with 5% to 10% of the off-highway truck fleet being unavailable or disabled at any time. Accordingly, in a fleet of fifty (50) off-highway trucks, at any given time five (5) trucks could be disabled and in need of repairs. Of course, these numbers vary from mine to mine and are somewhat dependent on the age of the off-highway truck fleet as well as the particular severity of the mining operation (steep haul road grades, poor environmental conditions, availability of good service technicians, etc.).

But if one were to assume that there might be five (5) disabled off-highway trucks at any one time, it would be fair enough to consider that at least two (2) or three (3) of these off-highway trucks could have become disabled at some distance from the off-highway truck maintenance and repair facility.

The typical way to move disabled off-highway trucks is to either tow them with chains or cables or pick them up by the front bumper to get the off-highway truck's front tires off the ground and then pull on the front bumper to move the off-highway truck. The front bumper o typical off-highway trucks is strong enough to sustain this lifting and pulling effort, though in some cases the front bumpers are reinforced. And, reinforced replacement front bumpers specifically designed for lifting and towing disabled vehicles can be purchased from Weldco-Beales of Edmonton, Alberta. To understand the forces required to lift the front of such an off-highway truck, consider a two hundred filly (250) ton capacity off-highway truck. The 'empty' weight of such an off-highway truck is plus/minus about two hundred fifty thousand (250,000) pounds. The vertical force required to lift the front of an empty off-highway truck from the front bumper can be about ninety thousand (90,000) pounds, while in the 'loaded' condition this off-highway truck can weigh about eight hundred fifty thousand (850,000) pounds. The front bumper lifting force required to lift this loaded off-highway truck can be about one hundred eighty thousand (180,000) pounds.

In some mines, it is typical to use a dedicated off-highway truck towing chassis with an incorporated lifting hook extending rearward from the off-highway truck towing chassis to hook on and lift/pull disabled off-highway vehicles. The rearward extended lifting hook must extend far enough behind the rear tires of the off-highway truck towing chassis so that as the off-highway truck towing chassis turns, the rear tires of the off-highway truck towing chassis do not come in contact with the front of the towed disabled vehicle. This off-highway truck towing chassis rearward extending lifting arrangement requires an off-highway truck towing chassis that is heavy enough to counterbalance the load imparted on the lifting hook when one end (e.g., the front end) of a disabled vehicle is picked up. Accordingly, it is often necessary to counterweight the front bumper of the off-highway truck towing chassis. Consequently, when not towing a disabled vehicle, the front axle of an off-highway truck towing chassis is often near overload or overloaded. Also, when the off-highway truck towing chassis has lifted and is towing a disabled vehicle, the rear axle of such an off-highway truck towing chassis is carrying an extreme load and may be overloaded.

Accordingly there are disadvantages associated with the conventional off-highway truck towing chassis rearward extending lifting/towing hook. One major disadvantage is the rear axle loading of the off-highway truck towing chassis that occurs when towing a disabled vehicle. The entire load being picked up and towed is being carried on the off-highway truck towing chassis rear axle. The off-highway truck towing chassis rear axle loading is similar to the center support load of a teeter-totter. Another significant disadvantage is that a front bumper counter balance weight is normally required on the off-highway truck towing chassis. These two factors severely impact the off-highway truck towing chassis, i.e., the rear axle loading when towing a disabled vehicle and the counterbalance front axle load weight when not towing a vehicle, and often result in extreme wear on the off-highway truck towing chassis at the front and rear chassis axles. Another drawback is the mechanical disadvantage at which the towing/lifting arrangement operates. When operating from the rear of the off-highway truck towing chassis, the size of the hydraulic cylinders and hydraulic oil flow required to raise and lower this lifting/towing hook is large. A further issue is the inability to easily move the lifting/towing hook side to side as the lifting/towing hook aligns with a companion socket on the disabled vehicle's bumper. An additional drawback to this lifting/towing arrangement is the sheer structural size required to operate at a considerable distance behind the rear tires of the off-highway truck towing chassis. Another complication of the rearward extending lifting/towing arrangement is the mechanical disadvantage in which an off-highway truck towing chassis rearward extending lifting/towing arrangement operates, i.e., only empty off-highway vehicles can easily be lifted and towed.

As such a need has developed to provide a superior hitting/towing arrangement for all sizes of off-highway vehicles and in particular off-highway trucks whether empty or loaded. The need is for an improved lifting/towing arrangement that has better flexibility and function, permitting the lifting/towing arrangement to be multi-functional. In addition, an improved lifting/towing arrangement will allow for increased hauling capabilities when used in a lowboy trailer towing configuration. There is also a need for an improved lifting/towing function that will allow for the use of Prime Movers several truck classes smaller (the off-highway truck towing chassis) to lift and tow larger loads. For example a 100 ton class off-highway truck can 200 ton class off-highway truck, a 150 ton class off-highway truck can tow a 300 ton class off-highway truck, and a 200 ton class off-highway truck can tow a 400 ton class off-highway truck.

SUMMARY

Trailing Axle Vehicle Recovery Tool

In response to the need for a more effective method to lift and tow large disabled off-highway vehicles, the present invention provides an Off-Highway Truck Towing Chassis in conjunction with an additional close coupled trailing axle. The tires on the close coupled trailing axle may be spaced relatively narrower outside-to-outside than the tires on the Off-Highway Truck Towing Chassis. In one embodiment, a rigid steel structure is attached to the Off-Highway Truck Towing Chassis at a universal hitch on the Off-Highway Truck Towing Chassis. The rigid steel structure extends from the Off-Highway Truck Towing Chassis and attaches and is supported by the trailing axle. The trailing axle attaches to the rigid steel structure via a link which allows the rigid steel structure to pivot up and down relative to the trailing axle in response to hydraulic cylinders which extend and retract causing the rigid steel structure to be raised and lowered relative to the trailing axle. In yet another embodiment (not shown) a separate pair of links could be actuated by a hydraulic cylinder on each set of links so that the pairs (2) of these links in the transport mode would be in an over center state, with little to no load supported by the hydraulic cylinders. The rigid steel structure further extends behind the trailing axle and incorporates a disabled vehicle lifting/towing hook.

The disabled vehicle lifting/towing hook of the rigid steel structure cooperates with a companion socket on a disabled off-highway vehicle so that as the hydraulic cylinders between the rigid steel structure and the trailing axle operate to raise the rigid steel structure, the lifting/towing hook on the rigid steel structure engages the disabled off-highway vehicle with a typical companion bumper socket hook point. In other words, the front tires of the disabled off-highway vehicle are then Idled and supported by the combination of the Off-Highway Truck Towing Chassis, rigid steel structure (trailing axle—tires) and the disabled vehicle's other axle(s) that remain on the ground.

The hook on the rigid steel structure can be set up so that it is adjustable vertically with the rigid steel structure as shown in the figures. This vertical adjustment allows the vehicle recovery tool to be readily adapted to various sizes of disabled vehicles.

As the rigid steel structure hydraulic cylinders raise the disabled off-highway vehicle a small upward vertical force vector is created at the Off-Highway Truck Towing Chassis universal hitch. For instance the vertical force implanted on a 100 ton class off-highway truck towing chassis when towing a 200 ton class off-highway truck is 50,000 lbs. an insignificant amount when compared to the 100 ton class off-highway truck chassis weight of 160,000 lbs.(including rigid steel structure weight) and likewise the vertical force implanted on a 200 ton class off-highway truck towing chassis when towing a 400 ton class off-highway truck is 85,000 lbs. again an insignificant amount when compared to the 100 ton class off-highway truck chassis weight of 320,000 lbs. (including rigid steel structure weight). And of course some ballast can be added to the off-highway truck towing chassis (as long as the laden gross vehicle weight is not exceeded, when not towing a disabled vehicle) thus allowing smaller class off-highway truck towing chassis 3 to tow larger class disabled vehicles. Because of the mechanical advantage imparted by the rigid steel structure's close coupled trailing axle this upward vertical force is minimal compared to the alternative downward vertical forces on the conventional Off-Highway Truck Towing Chassis rearward extending lifting/towing arrangement.

Lighter Duty Trailing Axle Vehicle Recovery Tool

Since there is a significant mechanical advantage to the lifting/towing arrangement with trailing axle, this lifting/towing arrangement allows extremely heavy disabled vehicles to be lifted and towed with smaller Prime Movers than those typically used in fact a 200 ton class off-highway truck can tow a 400 ton class off-highway truck. In fact, in lieu of an Off-Highway Truck Towing Chassis, the towing vehicle could be a bulldozer, large front end loader, and any other like or suitable large piece of mobile equipment as described in further detail hereinafter.

Lowboy Trailer Towing

A significant feature of this invention is the ability of the trailing axle in conjunction with the connecting hydraulic cylinders to raise and lower the rigid steel structure. In this regard, this steel structure not only has a lifting/towing hook behind the trailing axle tires, the steel structure also has a lowboy trailer attachment point midway between the trailing axle tires and the rigid steel structure's universal Off-Highway Truck Towing Chassis hitch. Such a midpoint lowboy trailer hitch provides for a much larger lowboy trailer carrying capacity (an additional axle the trailing axle has been added to the tractor trailer combination). The lowboy trailer load carrying capacity at such a midpoint lowboy trailer hitch can be optimized to benefit from not only the trading axle tire's load carrying capacity but also the Off-Highway Truck Towing Chassis load carrying capabilities. Because of the location of the rigid steel structure's midpoint lowboy trailer hitch, it can easily be raised and lowered in order to hook and unhook the lowboy trailer to and from the Off-Highway Truck Towing Chassis by way of the trailing axle arrangement. To facilitate this hooking and unhooking of the lowboy trailer, semi-permanent feet at the front of the lowboy trailer support the lowboy trailer some distance of the ground so that as the rigid steel structure with trailing axle midpoint lowboy trailer hitch is raised and/or lowered, the lowboy trailer can be hooked/unhooked from the Off-Highway Truck Towing Chassis rigid steel structure with trailing axle And, further by using the lifting/towing hook on the rear of the rigid steel structure with trailing axle, to hook and unhook from a lowboy trailer, a lowboy trailer (with lesser load carrying capabilities) could also be used. As one of ordinary skill in the relevant art will appreciate, a lowboy trailer is a common name for a type of trailer used to haul equipment such as off-road haulage equipment. An example is illustrated in U.S. Pat. No. 7,950,685. Specifically, lowboy trailers are commonly capable of hauling any of the types of vehicles described herein. In the off-road haulage industry, these types of trailers have become known by the vernacular expression for them in the industry as a "lowboy" trailers because the beds of these trailers are very low and close to the ground compared to the beds of other types of trailers.

The Trailing Axle Vehicle Recovery Tool

Thus this Vehicle Recovery Tool with Trailing Axle, Rigid Steel Structure, associated Hydraulic Cylinders and Hook Attachment Points, supports a disabled vehicle at the extreme rear of the Vehicle Recovery Tool. The Vehicle Recovery Tool can attach to the disabled vehicle directly or indirectly. Specifically, the disabled vehicle can be lifted from the lifting/towing hook and towed or the disabled vehicle could be put on a lowboy trailer and the lowboy trailer can be hitched to the midpoint lowboy trailer hitch of the Vehicle Recovery Tool.

A trailing axle arrangement for picking up and towing vehicles comprises a first attachment member for attaching to a towing vehicle and a second attachment member for attaching to a disable vehicle. A rigid steel structure couples the first attachment member and the second attachment member. An axle connects with or without suspension to the steel structure via a pivot arm to allow for relative movement. A hydraulic cylinder raises and lowers the steel structure relative to the axle, where the raising and lowering of the steel structure causes at least a portion of the disabled vehicle attached to the second attachment member to be raised from a surface.

The second attachment is either a universal hitch between the axle and the first attachment member or a hook at a rear of the rigid steel structure.

The rigid steel structure includes a tongue extending forwardly from the axle and ending in the first attachment member and the tongue provides for the first attachment member being substantially more distant from the axle than the hook at the rear of the rigid steel structure in order to provide for a mechanical advantage when a weight of the disabled vehicle is added to the hook.

A towing system comprises a towing vehicle and a trailing axle arrangement having a tongue extending forwardly from an axle for coupling to the towing vehicle and a hook extending rearwardly from the axle for hitching to a vehicle to be towed, where the tongue and the hook are parts of a rigid steel structure supported at its approximate midpoint by the axle. A joint couples the axle and the rigid steel structure and provides for relative movement between the axle and the rigid steel structure so that the hook moves between raised and lowered positions while the tongue at its coupling with the towing vehicle remains in a fixed position. Preferably, the towing system includes a universal hitch between the trailing axle and the first attachment member for picking up and towing a trailer having a mating type of hitch. A length of the tongue provides a mechanical advantage for lifting at the hook. The non-suspension joint includes a pivot coupling the axle and the rigid steel structure. An end of the tongue includes a fastener for mating to a complementary fastener on the towing vehicle. When a disabled vehicle is lifted by the hook the mechanical advantage provided by the length of the tongue results in a lifting force where the tongue couples to the towing vehicle that is less than a counterforce provided by a pull of gravity resulting from a weight of the towing vehicle. For example, the trailing axle has a capacity to lift a disabled vehicle having an empty weight of at least 80,000 pounds or a disabled lowboy trailer with a hauling capacity of at least 500,000 pounds.

DETAILED DESCRIPTION

The invention generally relates to a heavy duty-high capacity vehicle recovery arrangement and, more particularly, to a vehicle recovery tool capable of recovering disabled equipment such as that used in quarries, mines, steel mills, power plants, and/or landfills. Some embodiments of the invention further relate to a heavy duty-high capacity vehicle recovery tool that can be used both for picking up one end of a disabled piece of equipment and towing that piece of disabled equipment and/or hooking onto a lowboy trailer in one of several different configurations for hauling/carrying a disabled piece of equipment. Some embodiments of the invention further relate to a heavy duty-high capacity vehicle recovery tool capable of picking up and towing the largest currently used pieces of off-highway equipment (e.g., trucks, loaders, etc.) using a smaller vehicle recovery tool towing prime mover while maintaining the stability of the heavy duty-high capacity vehicle recovery tool towing prime mover.

Trailing Axle Vehicle Recovery Tool

In response to the need for a more effective method to lift and tow large disabled off-highway vehicles, the invention provides an off-highway truck towing chassis in conjunction with an additional close coupled trailing axle.

Figure 1:
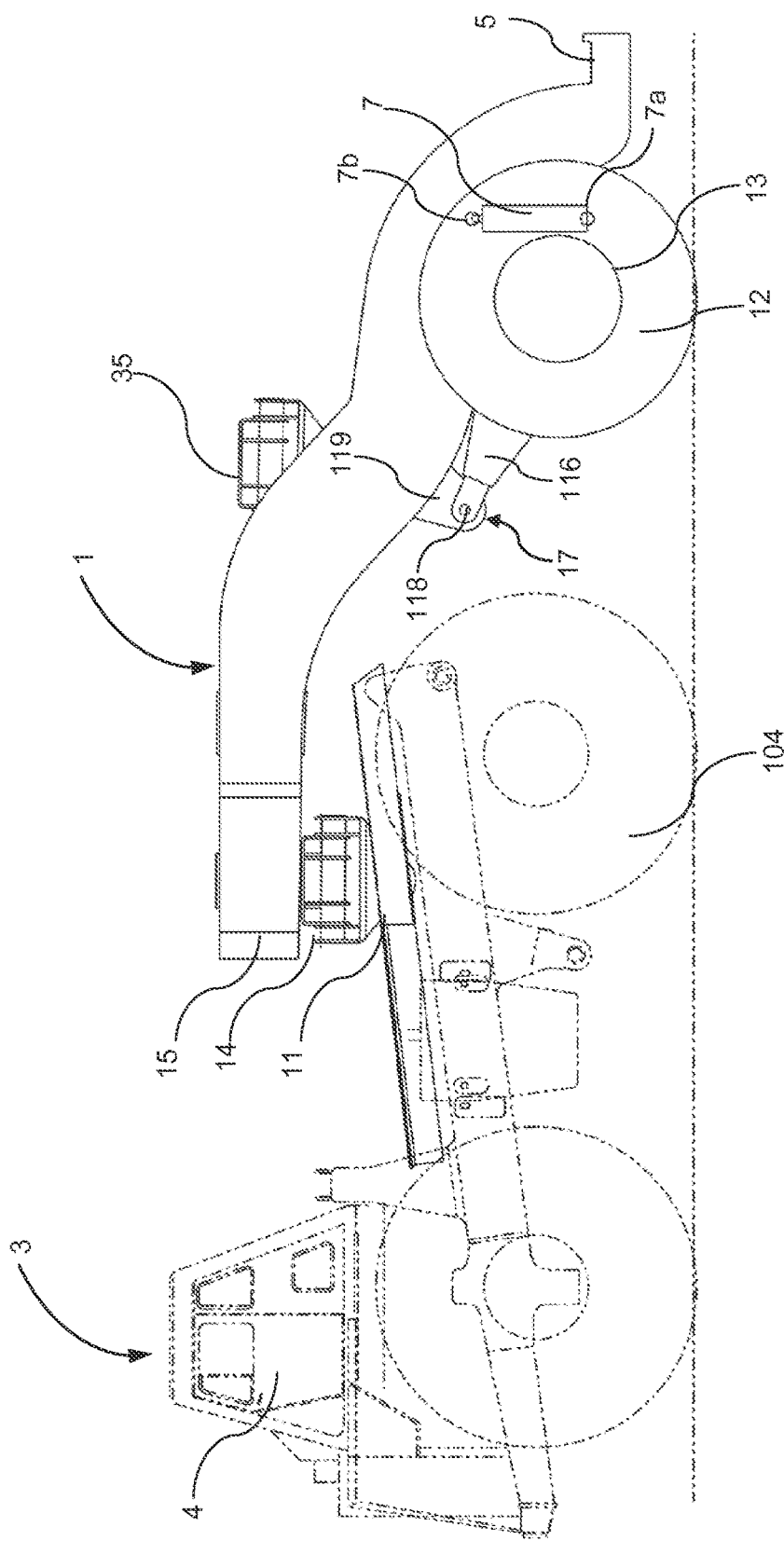
FIG. 1 is a side view of a heavy duty off-highway truck towing chassis with a vehicle recovery tool in the lowered position, according to one embodiment.

FIG. 1 is a side view of a heavy duty off-highway truck towing chassis 3 with a vehicle recovery tool 1, according to one embodiment. The tires 12 on the close coupled trailing axle 13 may be spaced relatively narrower outside-to-outside than the tires 104 on the off-highway truck towing chassis. The narrower spacing allows for a tighter turning radius of the vehicle recovery tool before the vehicle recovery tool tires contact the front of the towed vehicle. A rigid steel structure 15 forms a tongue that extends from the off-highway truck towing chassis 3 at a universal hitch 11 to the trailing axle 13 and then beyond the trailing axle to a lifting/towing hook 5. A universal hitch 14 attached to the forward end of the tongue formed by the rigid steel structure 15 mates to the universal hitch 11 in a conventional manner for such hitches. Typically such universal hitches are referred to as a six (6) way Hitch—(1 and 2) leans left and right, (3 and 4) rotates left and right (5 and 6) leans fore and aft. An example of a suitable hitch is a "pin-on" hitch sold by Philippi-Hagenbuch. Inc. of Peoria, Ill.

The trailing axle 13 attaches to the rearward area of the tongue formed by the rigid steel structure 15 via a linkage assembly 17, which allows the rigid steel structure 15 to be lifted upwardly from the trailing axle 13. The lifting action occurs as a pivot or rotation about the joint formed at the universal hitches 11 and 14. The length of the tongue, however, is sufficiently long compared to the stroke of the cylinder that provides the lifting that most of the movement seen at the hitch 35 and the lifting hook 5 is vertical. The hydraulic system for controlling the cylinder 7 is not illustrated, but includes hydraulic lines extending to the off-highway truck towing chassis 3 and includes a control system for operating the cylinder, which is preferably mounted in a cab 4 of the chassis 3.

The hydraulic cylinder 7 can be either a solid or cushioned hydraulic cylinder. In the cushioned configuration the hydraulics could have one or two external accumulators hooked to the extend port of the hydraulic cylinders. This external accumulator (s) would have a floating piston and on one side of the floating piston the accumulator chamber would be charged with nitrogen. And in the other side of the accumulator chamber from the floating piston, oil would flow in and out of this chamber. As the hydraulic cylinders are extended, hydraulic oil under pressure first compresses the nitrogen and then as the nitrogen pressure equalizes with that required to extend the hydraulic cylinder, the hydraulic cylinders extends. As the oil under pressure fills the extend side of the hydraulic cylinders, it also fills the oil chamber side of the accumulator with floating piston. And as floating piston is forced towards the nitrogen filled side of the accumulator, the nitrogen compresses. When the hydraulic cylinders are fully extended, this nitrogen then becomes a spring. As the trailing axle transverses rough terrain, this spring action of the compressed nitrogen systematically compresses and expands to maintain solid trailing axle ground contact as well as absorb trailing axle loading shocks.

Turning now to a more detailed description of the linkage assembly 17, the rigid steel structure 15 includes mount 119 for a pivot point 118 of the linkage assembly. The mount is integral with the rigid steel structure 15 and extends downwardly at about the middle of the tongue. Extending forwardly from the trailing axle 13 is a pivot arm 116, which is rigidly attached to the axle. In its lowered position illustrated in FIG. 1, the rigid steel structure 15 is in a lower position relative to the trailing axle 13. One end 7a of the hydraulic cylinder 7 is attached to the trailing axle in a conventional manner and the other end 7b is attached to a surface of the rigid steel structure 15. The substantially vertical orientation of the mounting of the cylinder 7 results in a stroke of the cylinder lifting the rigid steel structure from the trailing axle 13 about 2.5 to 3 feet in a typical embodiment. An example of a suitable hydraulic cylinder is double acting hydraulic cylinder with a ten (10) inch bore and a thirty six (36) to forty two (42) inch stroke. Such hydraulic cylinders are available from several sources such as Aggressive Hydraulics of Blaine, Minn. and Commercial/Parker hydraulics.

Although not shown, the trailing axle 13 and the rigid steel structure 15 includes mating components that allow for the steel structure to freely move up and down relative to the trailing axle in response to the hydraulic cylinder 7, while at the same time constraining lateral side to side trailing axle movement. The linkage assembly 17 maintains a connection between the rigid steel structure 15 and the trailing axle 13 to ensure mechanical stability between the structure and the axle. The mating structures typically do not include any suspension system, so they can be quite simple in construction.

Figure 2:
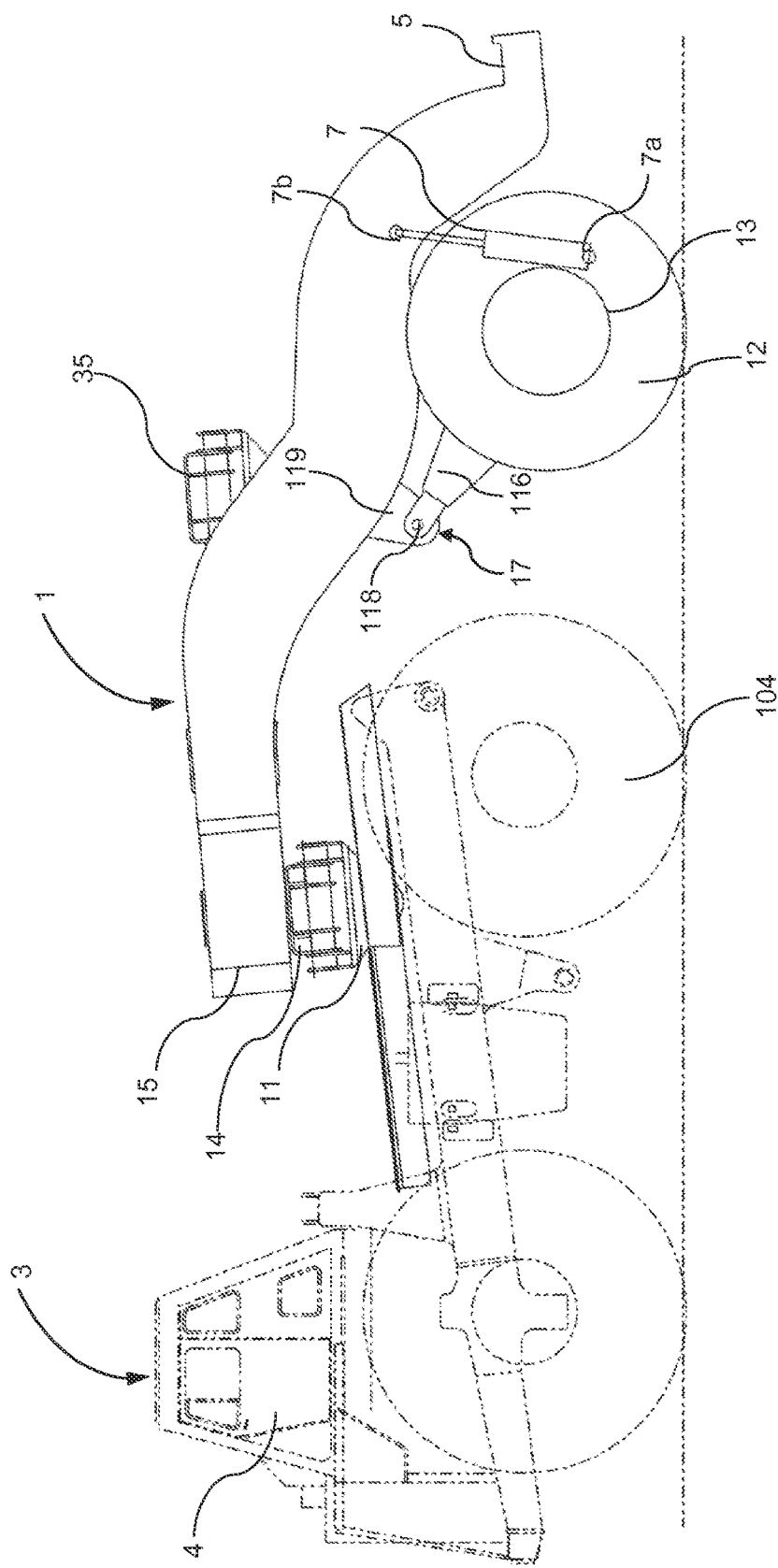
FIG. 2 is a side view of a heavy duty off-highway truck towing chassis with a vehicle recovery tool in a raised position, according to one embodiment.

As suggested by a comparison of the raised and lowered positions of the rigid steel structure 15 in FIGS. 1 and 2, the pivot arm 116 is rigidly mounted to the trailing axle 13 so that when the cylinder 7 is activated and the rigid steel structure 15 is lifted from the trailing axle, the wheels and tires of the axle rotate minimally clockwise to account for the rotation at the linkage assembly 17. In one embodiment, the pivot arm 116 and the mounting for the cylinder end 7a are on opposite ends of a collar rotatable mounted to the axle 13.

The disabled vehicle lifting/towing hook 5 of the rigid steel structure 15 cooperates with a companion socket on a disabled off-highway vehicle so that as the hydraulic cylinders 7 between the rigid steel structure 15 and the trailing axle 13 operate to raise the rigid steel structure 15, the lifting/towing hook 5 on the rigid steel structure 15 engages the disabled off-highway vehicle which typically has companion bumper socket attachment point. In other words, the front tires of the disabled off-highway vehicle are then lifted and supported by the combination of the off-highway truck towing chassis, rigid steel structure (trailing axle—tires) and the disabled vehicle's other axle(s) that remain on the ground. In one embodiment, the vehicle lifting/towing hook 5 is a pin that is three (3) to six (6) inches in diameter that mates with the bumper socket of the disabled vehicle.

Figure 1A:
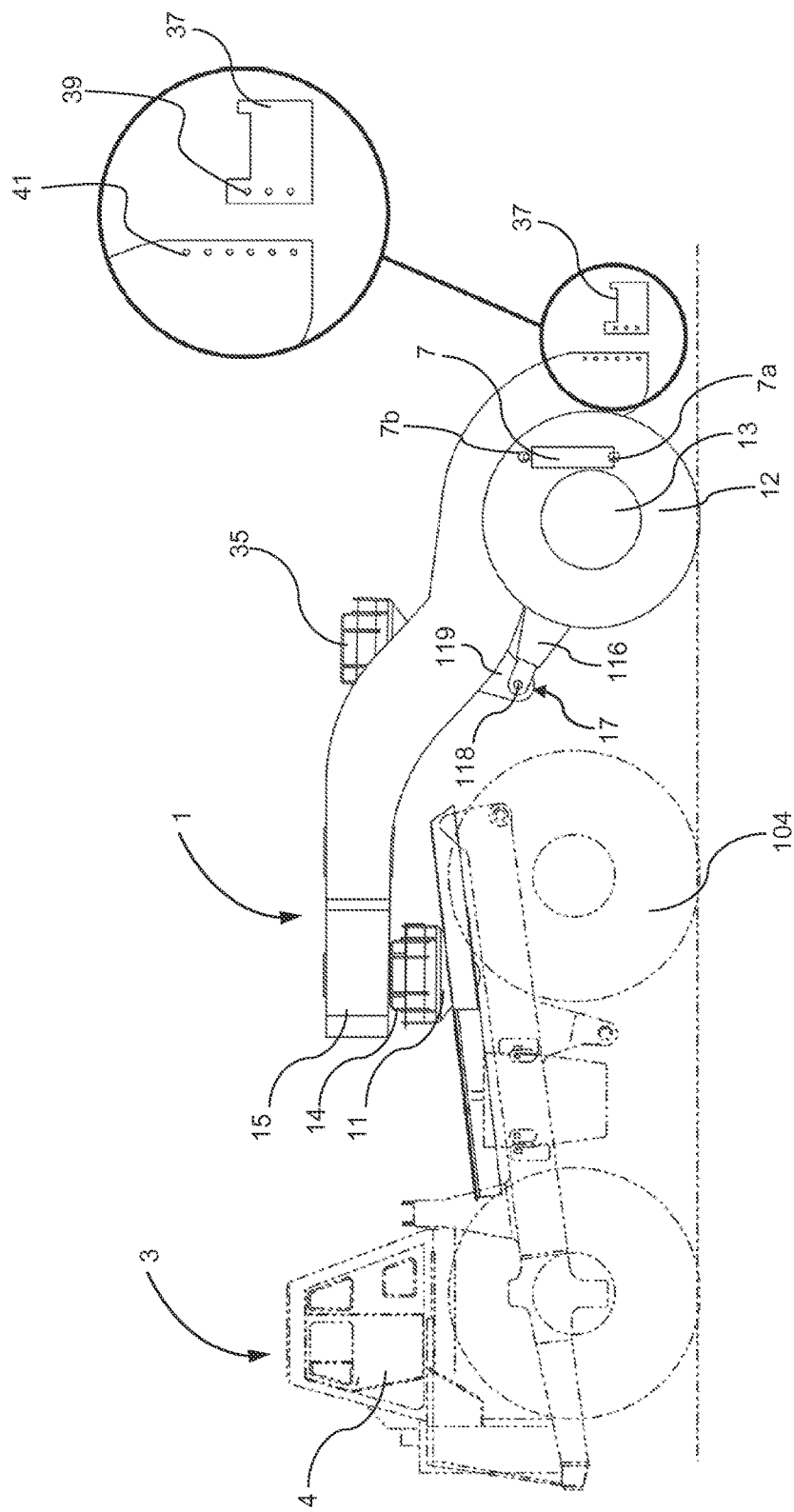
FIG. 1a is the side view of the heavy duty off-highway truck towing chassis and vehicle recovery tool of FIG. 1 with a vertically adjustable lifting and towing hook shown in an enlarged exploded view.

FIG. 1a is a side view of a heavy duty off-highway truck towing chassis and the vehicle recovery tool 1 as illustrated in FIG. 1 with a vertically adjustable lifting/towing hook relative to the rigid steel structure 15.

FIG. 2 is a side view of a heavy duty off-highway truck towing chassis and the vehicle recovery tool 1 as illustrated in FIG. 1 with the vehicle recovery tool in a raised position. As the rigid steel structure hydraulic cylinders 7 raise the disabled off-highway vehicle (not shown in FIG. 2), a small upward vertical force vector is created at the mated universal hitches 11 and 14 joining the off-highway truck towing chassis 3 and the forward part of the tongue formed by the rigid steel structure 15. Because of the mechanical advantage imparted by the rigid steel structure's 15 close coupled trailing axle the upward vertical force imparted on the towing chassis is minimal and the mated hitches 11 and 14 are designed to counteract such upward vertical forces. Again the imparted forces can be compared to the common playground teeter-totter. In the often observed playground situation the heavier occupant has to sit closer to the center point; the center point of the teeter totter in this case is the close coupled trailing axle. And the towed vehicle is hooked up proportionally closer to this center point (the trailing axle). And just as a lighter occupant on the opposing end of the teeter totter can counter balance a much heavier occupant on the other end. So can the off-highway truck towing chassis easily counterbalance the mass of a disabled off-highway vehicle? When towing a 240 ton class disabled vehicle/truck the front bumper load of the disabled vehicle would be approximately 100,000 lbs. and the vertical upward force vector on a 200 ton class off-highway truck towing chassis would be approximately 50,000 lbs., on an off-highway truck towing chassis weighing 320,000 lbs.; so the upward load on the off-highway truck towing chassis is insignificant in light of the chassis loading in the current alternative towing systems with extreme downward vertical force loading of the conventional off-highway truck towing chassis rear axle with the rearward extending lifting towing arrangement. In other words, the current alternative to picking up the bumper of a truck and towing it is an approach that grossly loads/overloads the rear axle of the towing vehicle. The vehicle recovery tool does the opposite in that the rear axle of the trailing axle does not adversely load the towing vehicle's rear axle at all.

Figure 3:
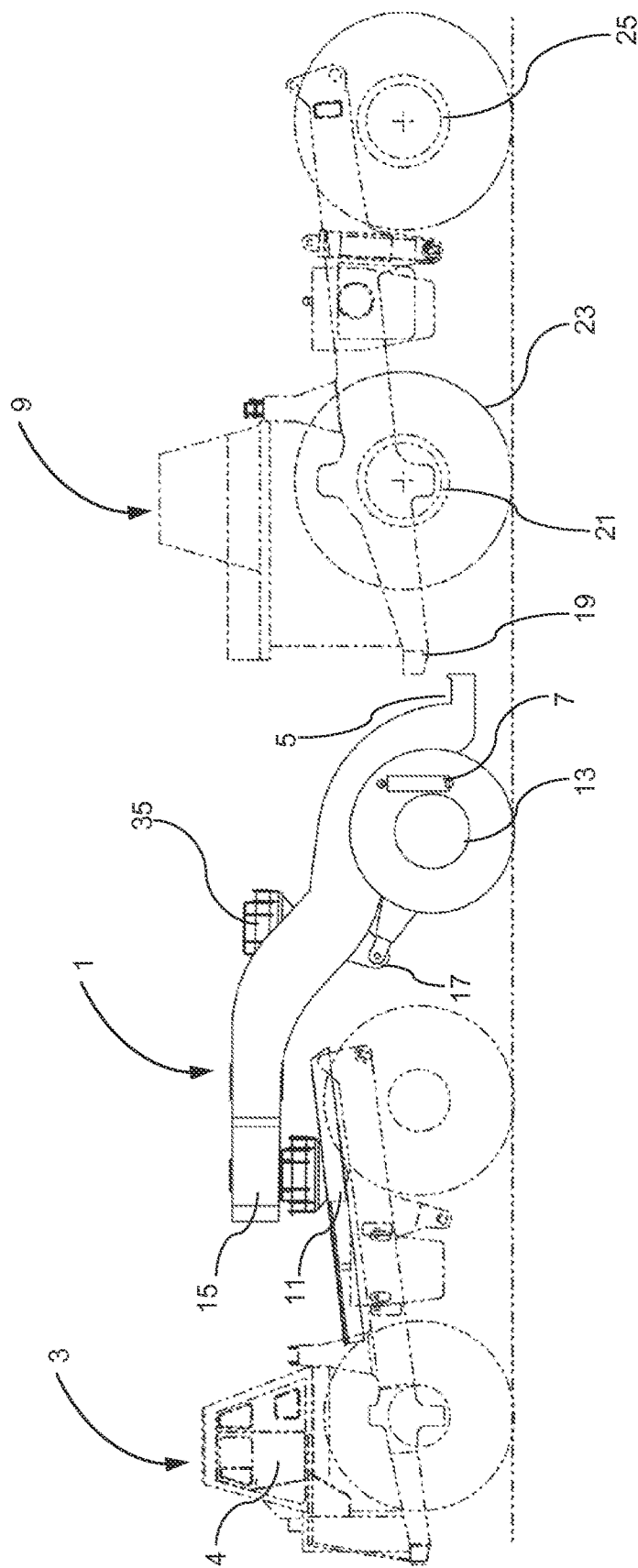
FIG. 3 is a side view of a heavy duty off-highway truck towing chassis with a vehicle recovery tool in a lowered position preparing to pick up a disabled vehicle, according to one embodiment.

FIG. 3 is a side view of a heavy duty off-highway truck towing chassis 3 with a vehicle recovery tool 1 in a lowered position, according to one embodiment. As shown, the lifting/towing hook 5 on the rigid steel structure 15 engages a disabled off-highway vehicle 9 which typically has companion bumper socket attachment point 19. The disabled off-highway vehicles has front and rear axles 21 and 25, respectively. As examples of the disabled vehicle include a Liebherr T-282 truck, a Caterpillar 793 truck, or a Komatsu 830E-AC truck, among others.

1. Liebherr T-282
    Gross Laden Weight 1,320,000 lbs/Empty Weight 525,000 lbs.
2. Caterpillar 793
    Gross Laden Weight 850,000 lbs/Empty Weight 360,000 lbs.
3. Komatsu 830
    Gross Laden Weight 850,000 lbs/Empty Weight 362,000 lbs.

These vehicles are characterized by bumper sockets that can receive the hook 5 of the vehicle recovery tool 1.

Figure 4:
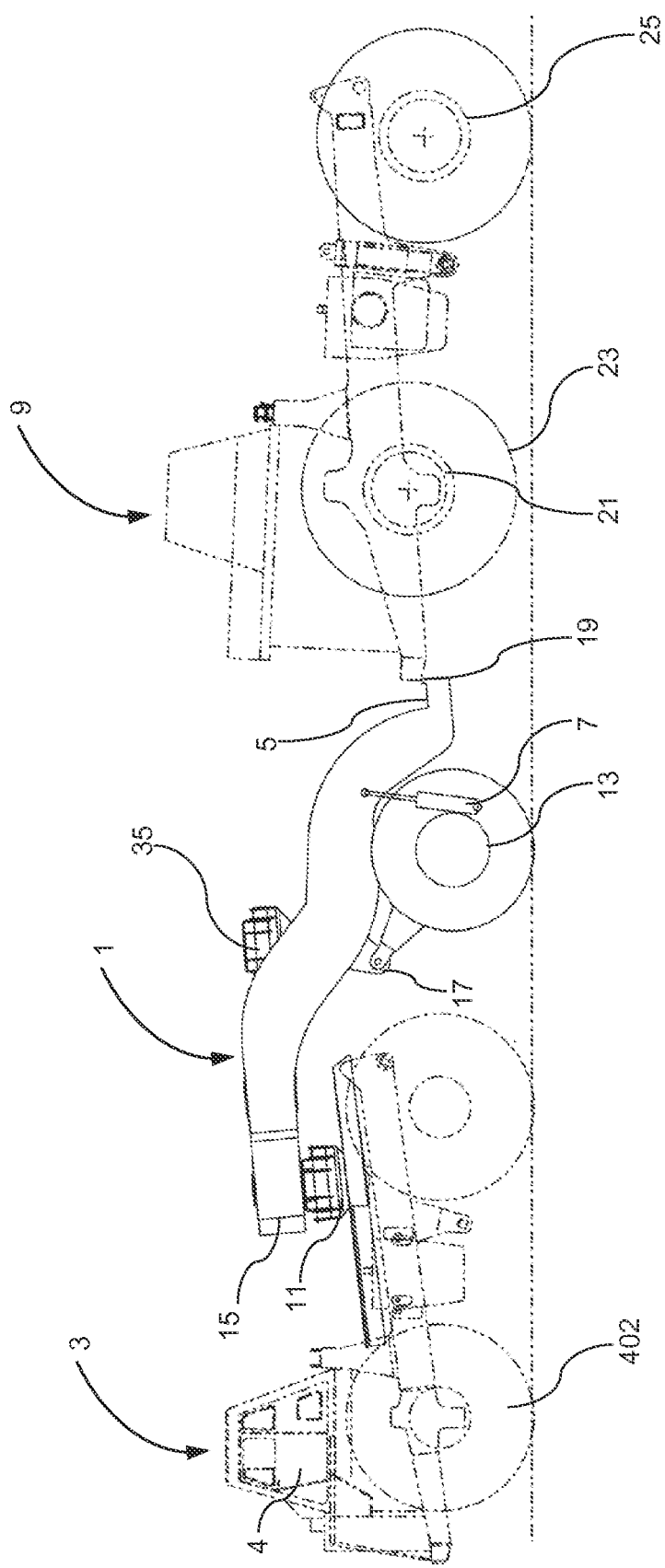
FIG. 4 is a side view of the heavy duty off-highway truck towing chassis with a vehicle recovery tool of FIG. 3 in a raised position with front tires of a disabled vehicle raised off the ground and the disabled vehicle readied for towing, according to one embodiment.

FIG. 4 is a side view of the heavy duty, off-highway truck towing chassis 3 with a vehicle recovery tool 1 of FIG. 3 in a raised position with front tires 23 of a disabled vehicle 9 raised off the ground and the disabled vehicle 9 then readied for towing, according to one embodiment.

Figure 5:
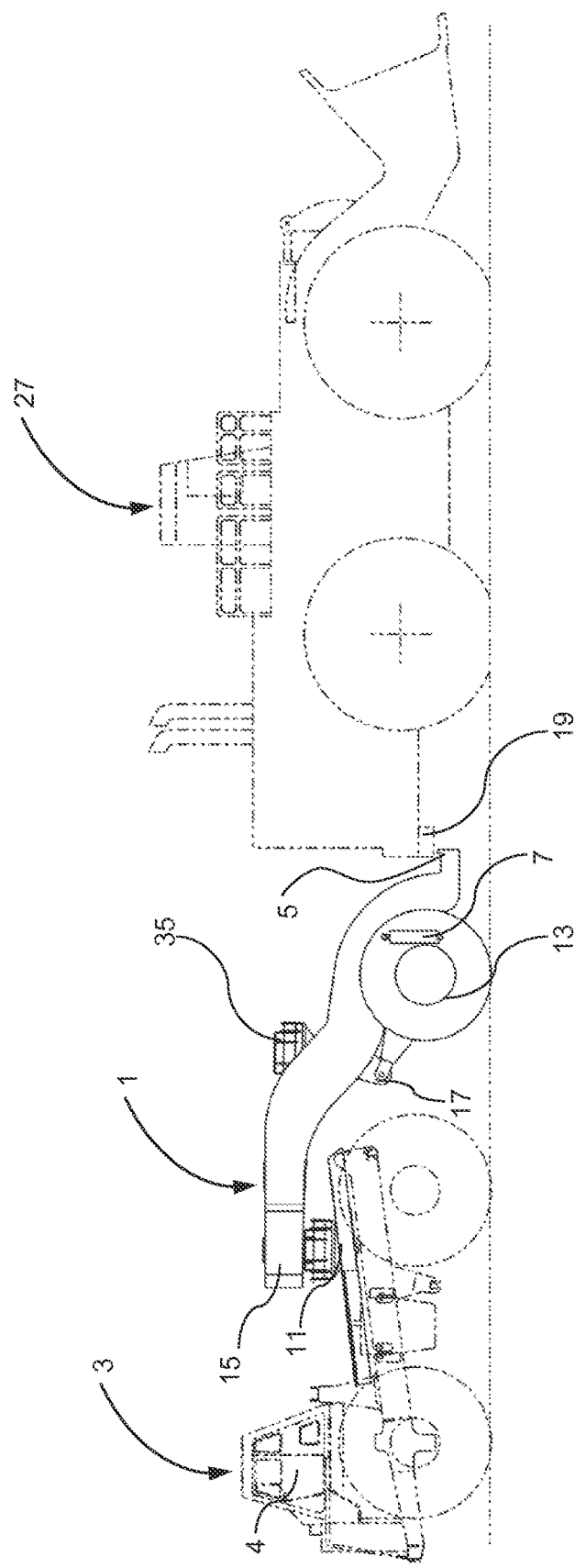
FIG. 5 is a side view of the heavy duty off-highway truck towing chassis with a vehicle recovery tool in a lowered position ready for positioning to pick up a disabled wheel loader, according to one embodiment.

FIG. 5 is a side view of the heavy duty off-highway truck towing chassis 3 with the vehicle recovery tool 1 in a lowered position ready for positioning to pick up a disabled wheel loader 27. Examples of disabled wheel loader 27 include a Letourneau L-1850 or L-2350 loader, a Komatsu WA-1200 loader, or a Caterpillar 994 loader, among others.

1. LeTourneau L-1850—Operating Weight 540,000 lbs.
2. LeTourneau L-2350—Operating Weight 600,000 lbs.
3. Komatsu WA1200-3—Operating Weight 470,000 lbs.
4. Caterpillar 994—Operating Weight 430,000 lbs.

These vehicles are characterized by bumper sockets that can receive the hook 5 of the vehicle recovery tool 1.

Figure 6:
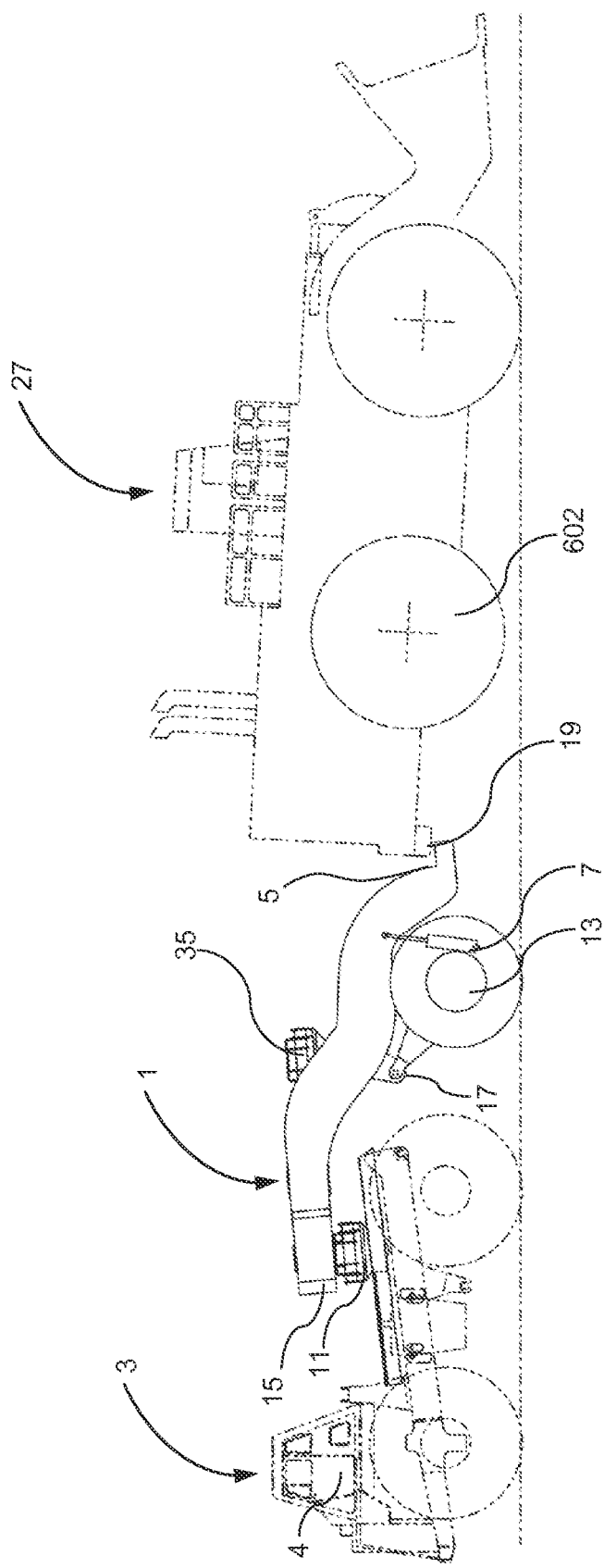
FIG. 6 is a side view of a heavy duty off-highway truck towing chassis with a vehicle recovery tool in the raised or transport position readied to tow a disabled wheel loader, according to one embodiment.

FIG. 6 is a side view of a heavy duty off-highway truck towing chassis 3 and the vehicle recovery tool 1 of FIG. 5 showing the tool in the raised or transport position readied to tow the disabled wheel loader 27. As shown, rear tires 602 of the disabled wheel loader 27 are raised off the ground and the disabled wheel loader 27 is then readied for towing.

Figure 7:
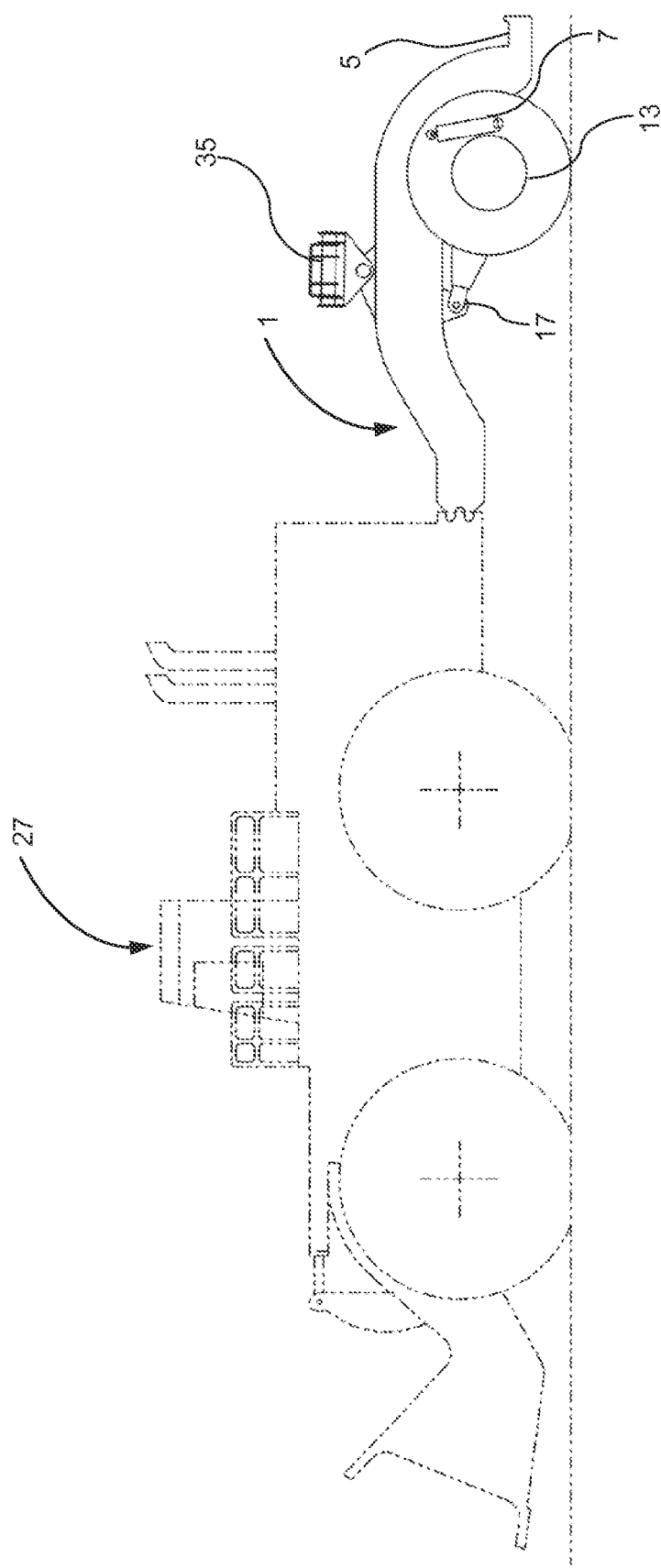
FIG. 7 is a side view of a vehicle recovery tool hooked up to a large off-highway wheel loader with the vehicle recovery tool in the lowered position ready for positioning to pick up a load, according to one embodiment.

The vehicle recovery tool 1 can be modified as illustrated in FIG. 7 so that it connects to a towing chassis by way of a different type of hitch then the universal hitch 11 in FIGS. 1-6. In the embodiment illustrated in FIGS. 7 and 8, the universal hitch 11 is replaced by a Large Drawbar Hitch or Large Pintle Hitch similar to that found on large farm equipment or smaller on-highway trucks only proportionally much larger.

FIG. 7 is a side view of the wheel loader 27 hooked to the vehicle recovery tool 1 with the vehicle recovery tool in the lowered position ready for positioning to pick up a load, according to one embodiment. Examples of the wheel loader 27 include a Letourneau L-1850 or L-2350 loader, a Komatsu WA-1200 loader, or a Caterpillar 994 loader, among others. All such wheel loaders have common hitch points with drawbar pins and/or pintle type hook points for receiving the tongue of a vehicle recovery tool 1 at the opposite end of the wheel loader 27 from the wheel loader bucket. In this configuration the greater the distance from the trailing axle to the wheel loader hook point 'compared' to the distance from the trailing axle to the disabled vehicle hook point causes a lessening of the vertical force that will be imparted on the wheel loader hooking point.

Figure 8:
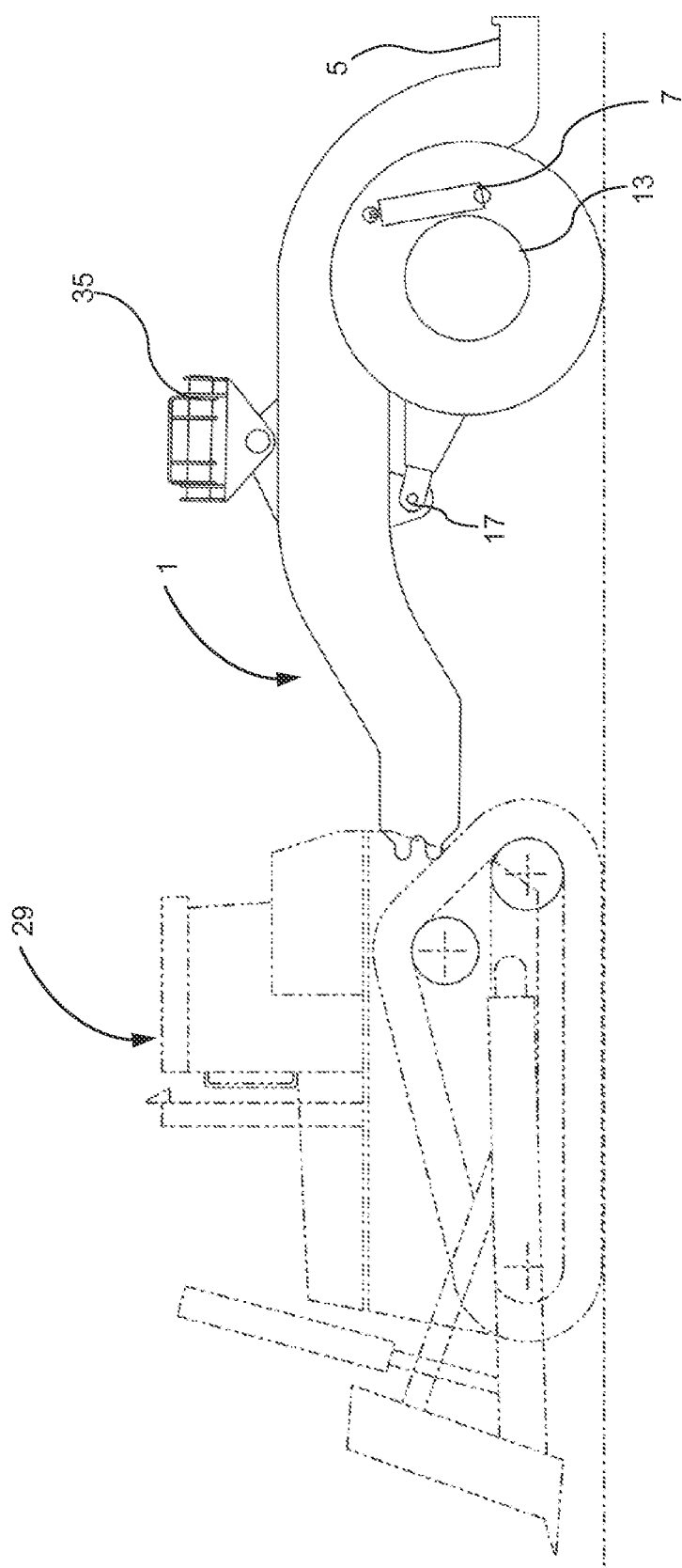
FIG. 8 is a side view of the vehicle recovery tool hooked up to a large commonly used track-type tractor or bulldozer, with the vehicle recovery tool in the lowered mode ready for positioning to pick up a load, according to one embodiment.

FIG. 8 is a side view of the vehicle recovery tool 1 hooked up to a large commonly used track-type tractor or bulldozer 29, with the vehicle recovery tool 1 in the lowered mode ready or positioning to pick up a load, according to one embodiment. Examples of track-type tractor or bulldozer 29 include a Komatsu D575 bulldozer or a Caterpillar D-10 bulldozer, among others.

1. Caterpillar D10 Track Type Tractor Operating Weight 146,000 lbs.
2. Komatsu D575 Super Dozer Operating Weight 335,000 lbs.

And, as the name of the Caterpillar bulldozer implies it and all such similar equipment are merely tractors on tracks and as such it is common for such tractors to have hitches for towing various implements.

Lighter Duty Trailing Axle Vehicle Recovery Tool

Since there is a significant mechanical advantage to the lifting/towing arrangement with trailing axle, this lifting/towing arrangement will allow extremely heavy disabled vehicles to be lifted and towed with smaller prime movers than those typically used. In fact, and as described in FIGS. 7 and 8, in lieu of an off-highway truck towing chassis, the towing vehicle could be a bulldozer, large front end loader/wheel loader, and any other like or suitable large piece of mobile equipment. Examples of specific hitches are Caterpillar's 2G0110 and 8D0555 hitches. The 2G0110 hitch would be appropriate for 100 ton class towing vehicles. For larger size towing vehicles, this hitch is just made proportionally larger. The 8D0555 hitch is for a much smaller towing vehicle.

Lowboy Trailer Towing

Figure 9:
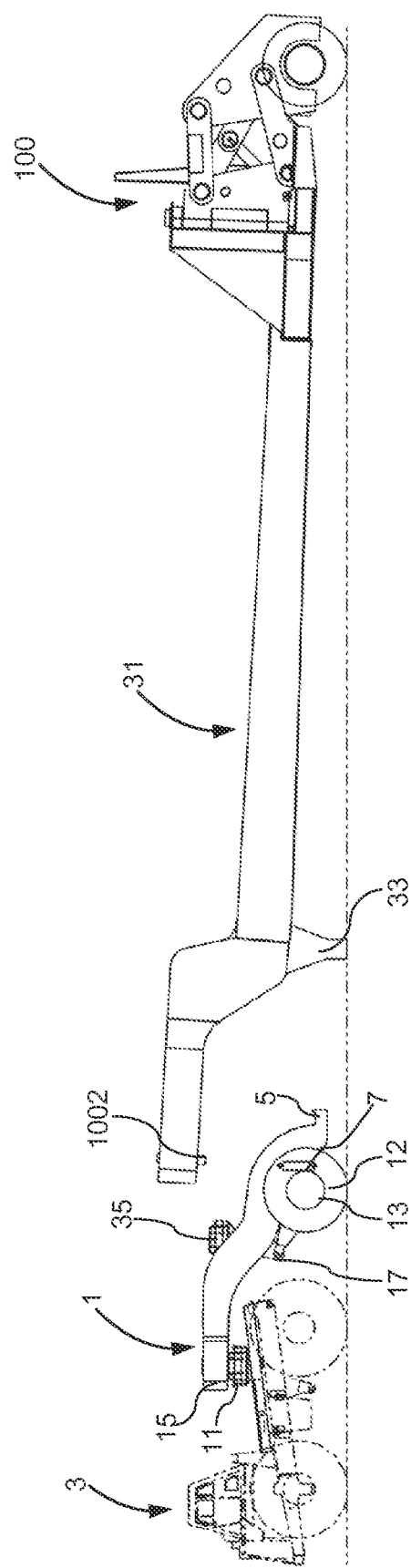
FIG. 9 is a side view of the vehicle recovery tool of FIGS. 1 and 2 in the lowered position ready for positioning to back under and hook up to a lowboy trailer at a midpoint on the vehicle recovery tool, according to one embodiment.

FIG. 9 is a side view of the vehicle recovery tool 1 of FIGS. 1 through 6 in the lowered position ready for backing under and hooking up to a lowboy trailer 31 at a midpoint 35 on the vehicle recovery tool, according to one embodiment of the lowboy trailer. One example of a rear loading lowboy trailer is described in U.S. Pat. No. 7,950,685, which is hereby incorporated by references for everything it teaches. In this regard, the details of the wheel assembly 100 is described in the '685 patent.

For lifting the lowboy 31 that has a forward tongue, the end of the tongue attaches to the universal hitch or lowboy attachment point 35 of the tool 1 midway between the trailing axle 13 and the rigid steel structure's universal off-highway truck towing chassis hitch 11. Such a midpoint lowboy trailer attachment point 35 provides for a much larger lowboy trailer carrying capacity (i.e., an additional axle—the trailing axle—has been added to the tractor trailer combination). The load carrying capacity of the lowboy trailer 31 at such a midpoint lowboy trailer attachment point 35 can be optimized, with the additional axle of the vehicle recovery tool 1. There are now four sets of axles/tires to carry whatever load is placed on the lowboy trailer 31 (two) axles on the off-highway truck towing chassis 3, (one) axle on the vehicle recovery tool 1, and (one) axle arrangement set at the rear of the lowboy trailer 31 versus just the (two) axles on the off-highway truck towing chassis 3 and (one) axle arrangement set at the rear of the lowboy trailer 31. The added vehicle recovery tool axle 12 adds to the total overall carrying capacity of the off-highway truck towing chassis 3 and the lowboy trailer 31. The end resultant is to maximize not only the trailing axle 12 tire's load carrying capacity but also the off-highway truck towing chassis' 3 load carrying capabilities with an additional axle and tires. Of course, the mechanics of such an arrangement need to be worked out with proper placement of the vehicle recovery tool hitch point on the off-highway truck towing chassis 3 so as to maximize the front and rear axle load carrying capacity of the off-highway truck towing chassis 3. Likewise the mechanics of the lowboy trailer hitch 35 attachment placement on the vehicle recovery tool 1 must also be worked out so as to maximize the combined load carrying capacity of the off-highway truck towing chassis 3 and the vehicle recovery tool trailing axle 13. Such mechanics consists of applying the well known engineering principles of "Sum of Forces" and "Sum of Moments" to properly place the off-highway truck towing chassis 3 vehicle recovery tool hitch point.

Because of the location of the rigid steel structure's 15 midpoint lowboy trailer attachment point 35, it can be easily raised and lowered in order to hook and unhook the lowboy trailer 31 to and from the off-highway truck towing chassis 3 by way of the vehicle recovery tool trailing axle arrangement. To facilitate this hooking and unhooking of the lowboy trailer 31, semi-permanent feet 33 at the front of the lowboy trailer 31 support the lowboy trailer 31 some distance off the ground so that as the rigid steel structure 15 with trailing axle midpoint lowboy trailer attachment point 35 is raised and/or lowered, the lowboy trailer 31 can be hooked/unhooked from the off-highway truck towing chassis 3 via the vehicle recovery tool 1 and its rigid steel structure 15 and trailing axle 13.

And, further by using the lifting/towing hook 5 on the rear of the rigid steel structure 15 with trailing axle 13, for hooking and unhooking to a lowboy trailer 31, a lowboy trailer (with lesser load carrying capabilities) could also be used.

Figure 10:
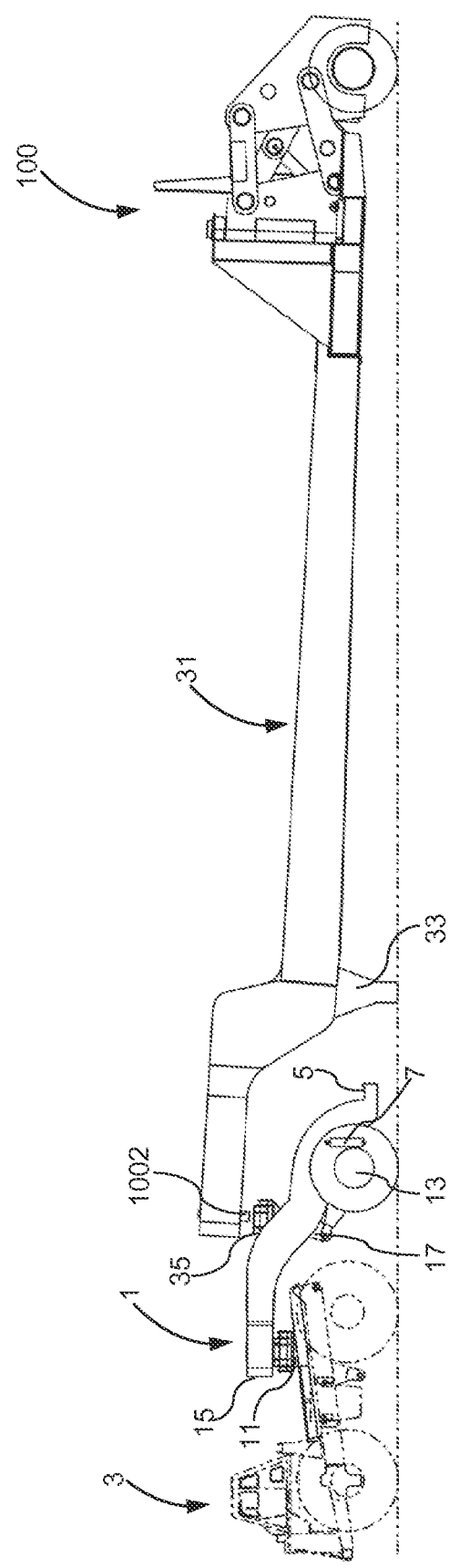
FIG. 10 is a side view of the heavy duty off-highway truck towing chassis with vehicle recovery tool of FIGS. 1 and 2 in the lowered position with vehicle recovery tool positioned 'under' a lowboy trailer hook pin of a lowboy trailer, according to one embodiment.

FIG. 10 is a side view of the heavy duty off-highway truck towing chassis 3 and the vehicle recovery tool 1 of FIG. 9 showing the tool in the lowered position with vehicle recovery tool positioned with respect to the lowboy 31 to align the lowboy trailer hook pin 1002 of a lowboy trailer 31 and the hitch 35.

Figure 11:
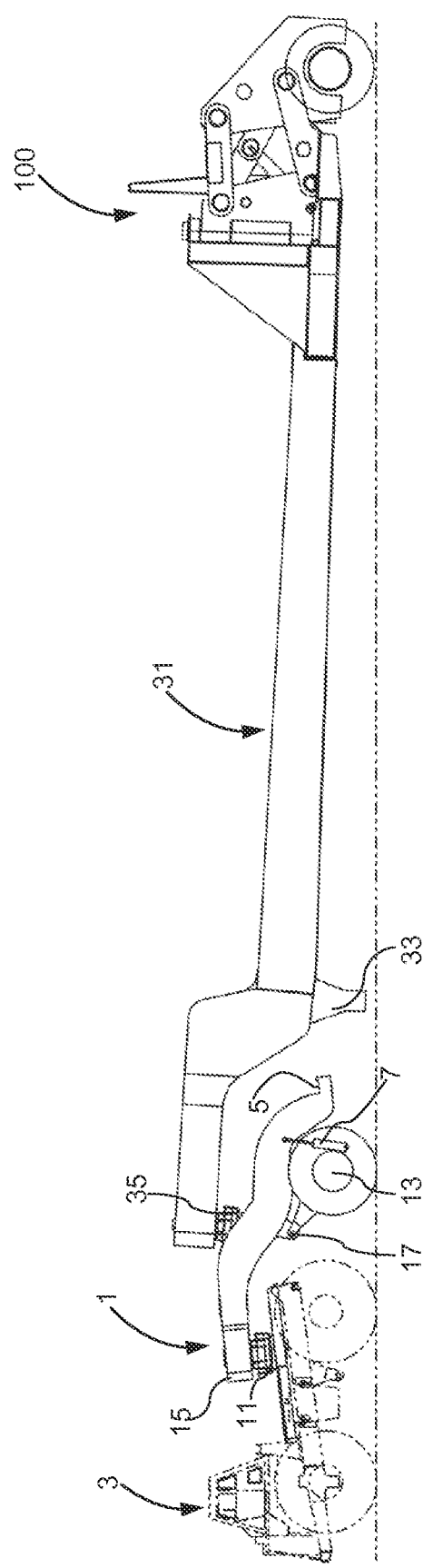
FIG. 11 is a side view of the heavy duty off-highway truck towing chassis with vehicle recovery tool of FIGS. 1 and 2 raised and hooked to the lowboy trailer hook pin, ready for towing the lowboy trailer, according to one embodiment.

FIG. 11 is a side view of the heavy duty off-highway truck towing chassis 3 and the vehicle recovery tool 1 of FIGS. 9 and 10 raised and hooked to the lowboy trailer hook pin 1002, ready for towing the lowboy trailer. As shown, the semi-permanent feet 33 at the front of the lowboy trailer 31 are raised off the ground, leaving only the tires of the wheel assembly 100 on the ground.

Figure 12:
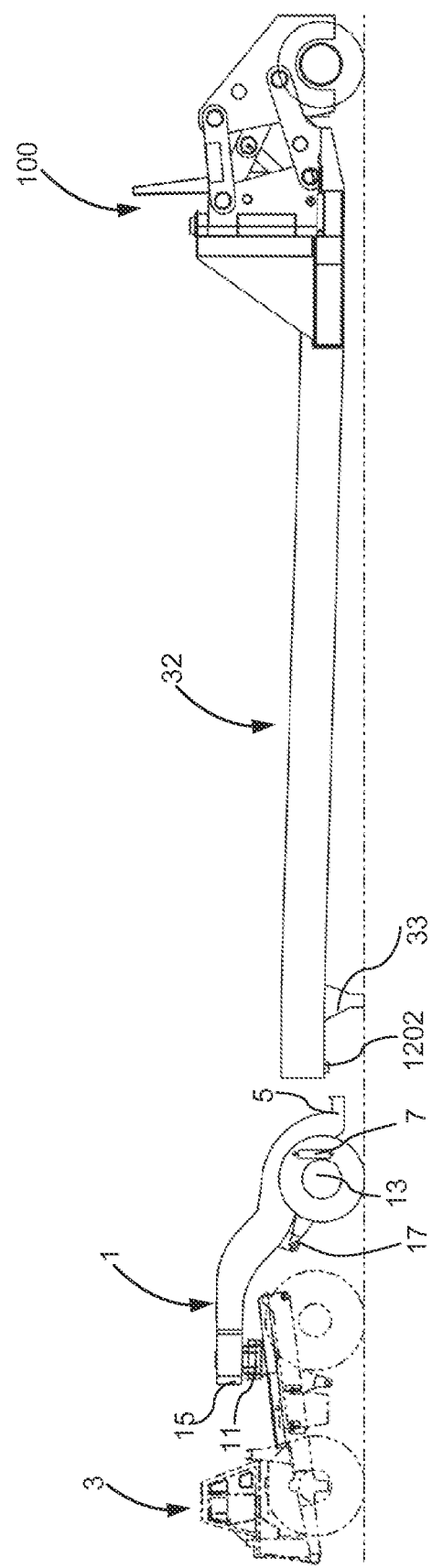
FIG. 12 is a side view of the heavy duty off-highway truck towing chassis with vehicle recovery tool in the lowered position with lifting/towing hook ready for positioning to back under and hook up at the 'rear' of the vehicle recovery tool to a lowboy trailer with the normal 'gooseneck' removed, according to one embodiment.

In another embodiment illustrated in FIG. 12, a lowboy trailer 32 does not have a forward tongue gooseneck. For towing this lowboy trailer, a front hitch 1202 of the lowboy trailer is connected to the hitch 5 of vehicle recovery tool. The hitch 1202 on this lowboy trailer 32 would be analogous the hitch point found on the bumpers of disabled vehicles. In a further embodiment (not shown) of a lowboy trailer, the lowboy trailer could be a front loading lowboy trailer and the hitch point on the lowboy trailer could be rotated down for items to loaded/driven at the front of the trailer and then this hitch point could be rotated up for attachment by the vehicle recovery tool hitch 5.

FIG. 12 is a side view of the heavy duty off-highway truck towing chassis 3 and the vehicle recovery tool 1 of FIGS. 1-6 shown with the tool in the lowered position ready for backing under and hooking up at the 'rear' of the vehicle recovery tool to the front of a lowboy trailer 32 with the normal lowboy trailer 'gooseneck' or tongue removed. As shown, the lifting/ towing hook 5 on the rear of the rigid steel structure 15 with trailing axle 13 can attach to a front hitch 1202 of the lowboy trailer 32.

Figure 13:
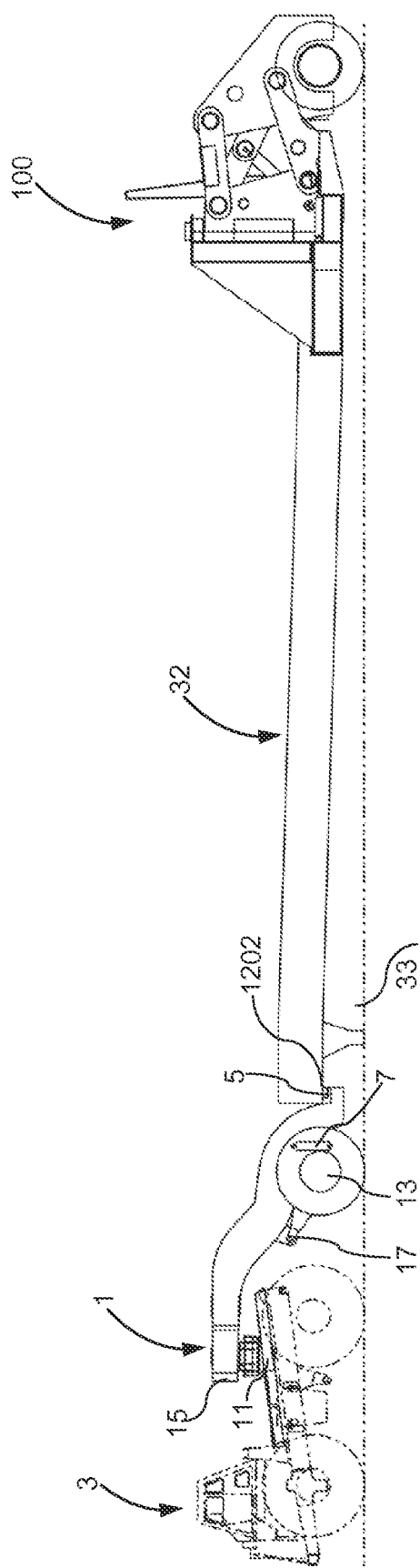
FIG. 13 is a side view of the heavy duty off-highway truck towing chassis with vehicle recovery tool in the lowered position, positioned to hook up with the lifting/towing hook on the 'rear' of the vehicle recovery tool to a lowboy trailer with the normal 'gooseneck' removed, according to one embodiment.

FIG. 13 is a side view of the heavy duty off-highway truck towing chassis 3 and the vehicle recovery tool 1 with the tool in its lowered position, positioned to hook up with the lifting/towing hook 5 on the 'rear' of the vehicle recovery tool to a lowboy trailer 32 with the normal 'gooseneck' removed.

Figure 14:
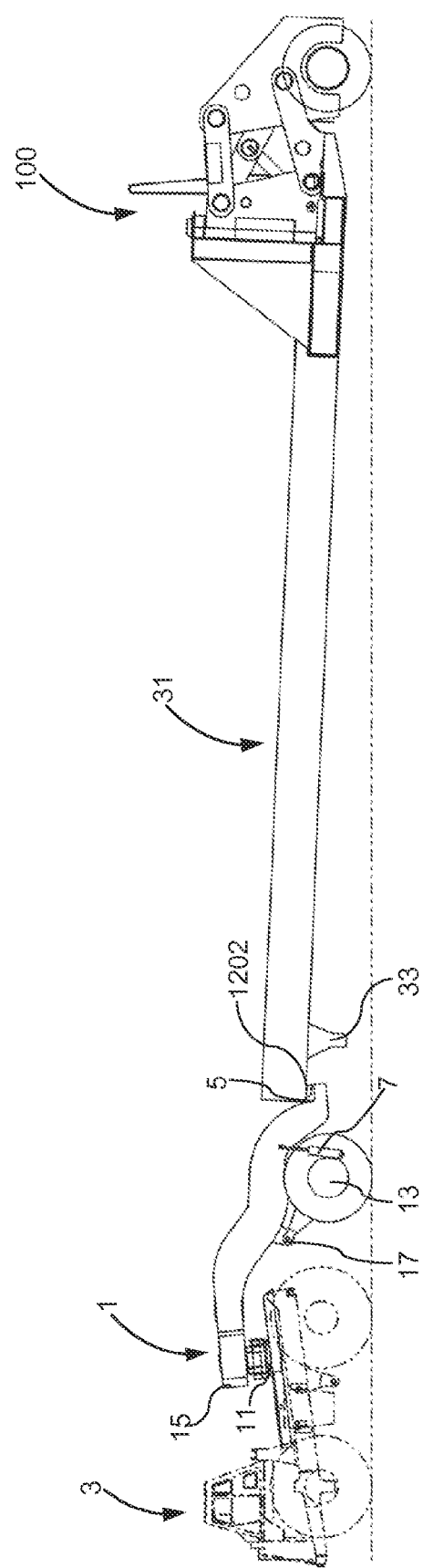
FIG. 14 is a side view of the heavy duty off-highway truck towing chassis with vehicle recovery tool, raised and hooked up into the lifting/towing hook on the 'rear' of the vehicle recovery tool to a lowboy trailer ready for towing with the normal 'gooseneck' removed, according to one embodiment.

FIG. 14 is a side view of the heavy duty off-highway truck towing chassis 3 and the vehicle recovery tool 1 with the tool, raised and hooked with the lifting/towing hook 5 on the 'rear' of the vehicle recovery tool hooked to a lowboy trailer 32 ready for towing. As shown, the lifting/towing hook 5 on the rear of the rigid steel structure 15 with trailing axle can attach to a front hitch 1202 of the lowboy trailer 32. The rigid steel structure 15 is raised so that semi-permanent feet 33 at the front of the lowboy trailer 32 are raised off the ground.

Accordingly, in some embodiments, the vehicle recovery tool 1 with the trailing axle 13, rigid steel structure 15, associated hydraulic cylinders 7, and hook attachment points 5 supports a disabled vehicle at the extreme rear of the vehicle recovery tool. The vehicle recovery tool 1 can attach to the disabled vehicle directly or indirectly. Specifically, the disabled vehicle can be lifted by the lifting/towing hook and towed or the disabled vehicle can be put on a lowboy trailer, and the lowboy trailer can be hitched to the vehicle recovery tool 1 and towed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the-plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise Indicated herein or otherwise clearly contradicted by context.

The invention claimed is:

1. A towing arrangement comprising:
    a single structural member;
    a first attachment point rigidly attached at one end of the single structural member for attachment to a towing vehicle allowing for lateral and vertical movement about the first attachment point;
    a second attachment point rigidly attached at another end of the single structural member for attachment to a component being towed;
    an intermediate pivoting axle rigidly attached to and supporting the single structural member such that the intermediate pivoting axle cannot move along a length of the single structural member; and
    a device for controlling the pivoting of the intermediate pivoting axle relative to the single structural member so as to raise and lower the second rigidly attached attachment point relative to a surface supporting the component being towed.

2. The towing arrangement of claim 1 wherein the arrangement has a capacity to tow a component having a weight of at least 80,000 pounds.

3. The towing arrangement of claim 1 wherein the arrangement is configured to hitch to a lowboy trailer.

4. The towing arrangement of claim 1 wherein the first and second attachment points are rigidly attached at opposing ends of the single structural member.

5. The towing arrangement of claim 1 including a suspension element in the connection between the single structural member and the intermediate pivoting axle.

6. The towing arrangement of claim 1 wherein the intermediate pivoting axle and the single structural member are directly connected without an intervening suspension system.

7. The towing arrangement of claim 1 wherein the single structural member extends forwardly from the intermediate pivoting axle to the first rigidly attached attachment point and wherein the second rigidly attached attachment point is at an opposite end of the single structural member and the first rigidly attached attachment point is substantially more distant from the intermediate pivoting axle than the second rigidly attached attachment point in order to provide for a mechanical advantage when a portion of the weight of the component being towed is added to the second rigidly attached attachment point.

8. A towing system comprising:
a pivoting axle for trailing a towing vehicle;
a single structural member supported by the pivoting axle so as to allow vertical movement of the single structural member but not allow movement of the pivoting axle along a length of the single structural member;
a first portion of the single structural member extending forwardly from the pivoting axle and ending in a first attachment for coupling to the towing vehicle so as to allow for vertical and lateral rotation of the single structural member about the towing vehicle coupling;
a second portion of the single structural member extending rearwardly from the pivoting axle and ending in a rigidly secured second attachment for engaging a component to be towed; and
a device connecting the single structural member and the pivoting axle to control the vertical movement of the single structural member so that the second attachment engaged with the component to be towed is raised and lowered between engaged and disengaged positions, respectively.

9. The towing system of claim 8 including a universal hitch disposed on the single structural member between the pivoting axle and the first attachment of the single structural member for picking up and towing a trailer having a mating type of hitch.

10. The towing system of claim 9 wherein the universal hitch mates to a complementary coupling at an end of a gooseneck of a lowboy trailer.

11. The towing system of claim 9 wherein the single structural member has a capacity to lift a lowboy trailer at the universal hitch.

12. The towing system of claim 8 wherein a length of the portion of the single structural member that extends forwardly to the first attachment coupled with the towing vehicle provides a mechanical advantage for lifting a portion of the component to be towed at the second attachment.

13. The towing system of claim 12 wherein, when a portion of, the component to be towed is lifted at the second attachment, mechanical advantage provided by the length of the portion of the single structural member extending forwardly from the pivoting axle results in a lifting force at the first attachment coupled with the towing vehicle that is less than a counterforce provided by a pull of gravity resulting from a portion of weight of the towing vehicle.

14. The towing system of claim 13 wherein the single structural member has a capacity to tow a component having a weight of at least 80,000 pounds.

15. The towing system of claim 13 wherein the single structural member has a capacity to lift a lowboy trailer at a universal hitch.

16. The towing system of claim 8 wherein the first attachment of the single structural member includes a coupling for hooking to the towing vehicle.

17. The towing system of claim 8 wherein a hook at the second attachment of the single structural member mates to a complementary coupling at an end of a lowboy trailer without a gooseneck extending from a front of the trailer.

18. The towing system of claim 8 wherein the pivoting axle and the single structural member are directly connected without an intervening suspension system.

19. The towing system of claim 8, wherein actuation of a hydraulic cylinder connecting the pivoting axle and the single structural member causes the single structural member to pivot about the first attachment coupled with the towing vehicle1.

* * * * *